UNITED STATES PATENT OFFICE.

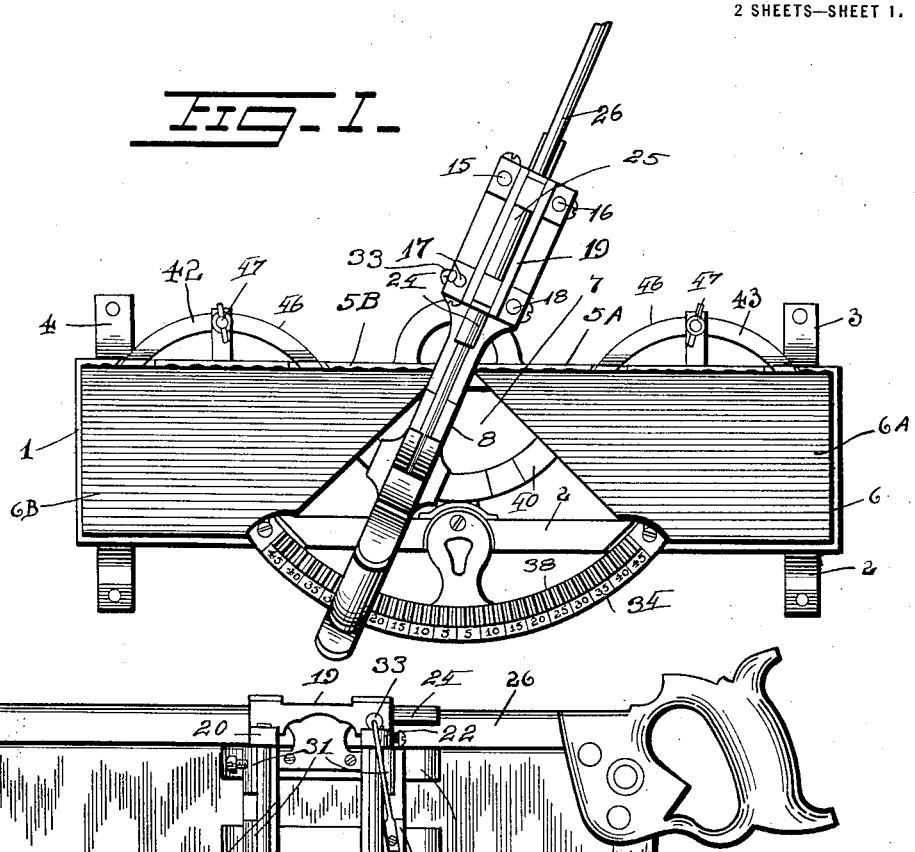

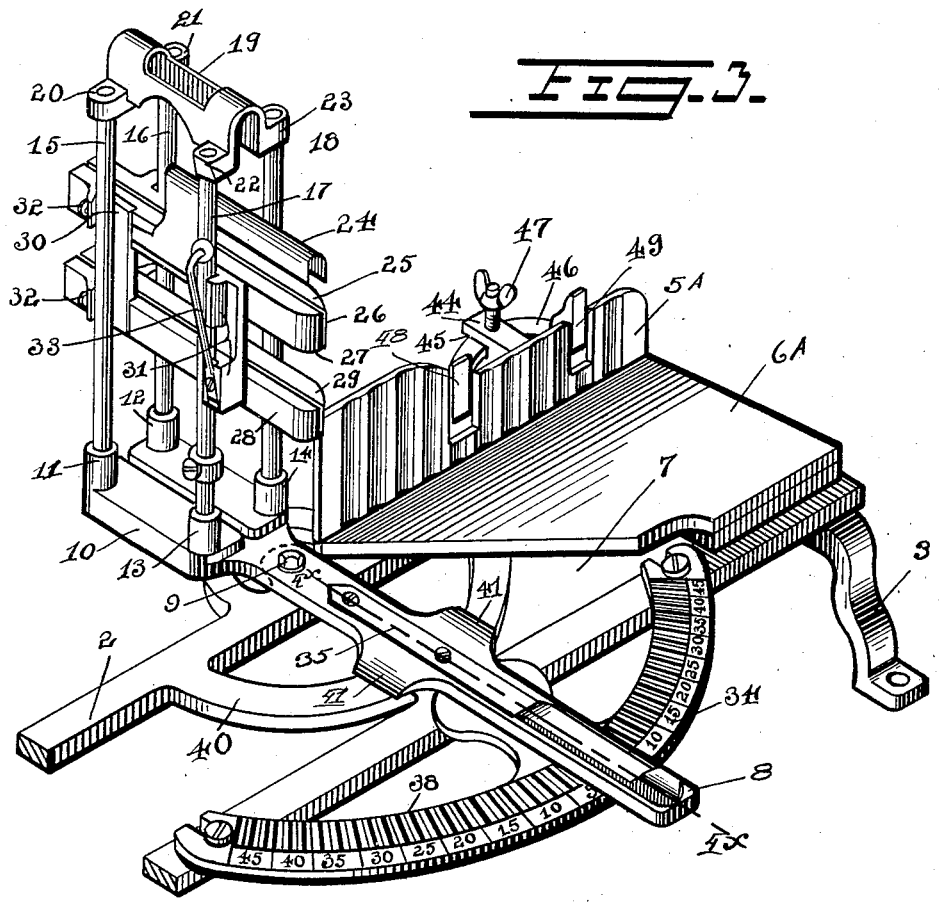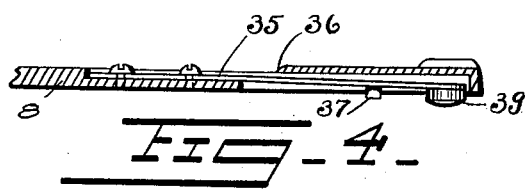

ALPHONSE ILTIS, OF ROCHESTER, NEW YORK.

MITER-BOX.

1,316,306.  Specification of Letters Patent.  Patented Sept. 16, 1919.

Application filed April 21, 1919. Serial No. 291,636.

*To all whom it may concern:*

Be it known that I, ALPHONSE ILTIS, a citizen of the United States, residing at Rochester, in the county of Monroe and State of New York, have invented certain new and useful Improvements in Miter-Boxes, of which the following is a specification.

The object of this invention is to provide new and improved construction for miter boxes.

This and other objects of this invention will be fully illustrated in the drawings, described in the specification and pointed out in the claims at the end thereof.

In the accompanying drawings,

Figure 1 is a top plan view of the miter box.

Fig. 2 is a side elevation of the miter box.

Fig. 3 is a perspective view of the miter box with its frame partly broken away.

Fig. 4 is a vertical section on the line 4ˣ—4ˣ of Fig. 3.

In the several figures of the drawings, like reference numerals indicate like parts.

The base 1 of the miter box comprises the horizontal frame work 2 which is supported on suitable standards 3 and 4 at each end thereof. Fastened to the rear of the frame work 2 are the vertical backing plates 5ᴬ and 5ᴮ. The material may be lined up on these backing plates and on the table 6, which table is also fastened to the frame 2 to properly support the material placed thereon. The table 6 is made up of two sections, 6ᴬ and 6ᴮ, with an angular space 7 provided between them in which the arm 8 is mounted to swing. The arm 8 is mounted at 9 to the frame 2 and carries on the outer end thereof the platform 10. This platform has a series of four lugs 11, 12, 13 and 14 integral therewith in which the vertical guide rods 15, 16, 17 and 18, respectively, are mounted. At the upper end of these rods a bridge 19 is provided having lugs 20, 21, 22 and 23 at each side, into which the rods 15 to 18, inclusive, are fastened to hold them properly spaced apart.

The bridge 19 comprises an inverted channel into which the upper portion 24 of the saw guide 25 is adapted to project when the saw is held in its elevated position and is not in use. This position is shown in elevation in Fig. 2.

The saw used for cutting the miter joints is preferably a saw having a rigid back 26 fastened to the rear of the saw blade 26ᴬ to make the saw blade rigid. This insures a straight cut in making the miter joints. The back 26 of the saw which stiffens the saw blade is considerably thicker than the saw blade 26ᴬ proper, and this enlarged back is adapted to pass through the upper portion 24 of the guide 25. For this purpose the portion 24 of the guide is channel shaped to receive the back 26 of the saw and allow its reciprocation therein.

The guide 25 is made up of four individual horizontal guide bars 26, 27, 28 and 29. These guide bars are held together in pairs by the brackets 30, two of each of these brackets being used on each side of the guide for holding one of the pair of guide bars together. The brackets 30 are set into the guide bars as shown in Fig. 3 and are provided with lugs 31 which project out therefrom. Each bracket 30 is provided with two of these lugs and the brackets are so placed on the guide bars that two lugs of each pair of brackets will embrace two of the vertical guide rods and thus form guide members for the guides 25, holding the guide members in alinement with the vertical guide rods 15, 16, 17 and 18. The set screws 32 are provided in the lugs 31 to take up the wear between the vertical lugs 31.

The upper channel guide portion 24 of the guide 25 is fastened to the outside of the guide bars 26 and 27 and holds these bars spaced apart for the insertion of the saw blade 26ᴬ between them.

A spring catch 33 is fastened to one of the brackets 30, which catch is adapted to spring over the top of the lug 22 and hold the guide 25 in its extreme upper position, in which position the saw is held idle. The horizontal guide bars 25 to 29, inclusive, are made of hard wood, as it has been found in practice that wood is the only material which will provide a smooth guiding surface without undue friction between it and the saw blade.

The arm 8, which carries the guide 25 and the saw, extends forward over the frame 2 and its end overlaps the quadrant 34 on which the angular position of the lever with relation to the frame 2 and the backing plates 5ᴬ and 5ᴮ is indicated.

The quadrant 34 is fastened to the frame 2 concentrically with the pivot 9 of the arm 8 and the arm may be held in place in any angular position on the frame within the range of the quadrant by means of the spring catch 35. The spring catch 35 comprises a leaf spring which is fastened to the upper side of the arm 8 and projects through the opening 36 to the underside of the lever near the outer end thereof where the wedge shaped pin 37 is fastened to it. The pin 37 is adapted to make engagement with the radial grooves 38 provided at intervals of 1 deg. in the quadrant 34. The leaf spring holds the pin 37 normally in place in one of the grooves 38 and thus holds the arm in place on the frame. A knob 39 is fastened to the extreme end of the leaf spring carrying the pin 37, and the pin may be disengaged from the grooves 38 by means of this knob when it is raised.

In addition to the graduation of the quadrant 34 which is calibrated in degrees, a second quadrant 40 is provided integral with the frame 2. On this second quadrant 40, only the graduations which are most frequently used in the cutting of the miter joints, are provided. An indicator 41 is integral with the arm 8 on each side thereof by means of which the arm can be lined up on the quadrant 40.

The gages 42 and 43 are provided on each of the backing plates 5$^A$ and 5$^B$ by means of which the material may be lined up preparatory to the cutting of the miter joint. Each of these gages comprises a bracket 44 which is fastened to the rear of the backing plate and has a horizontal slot 45 provided therein. A semi-circle or bar 46 is mounted to slide in this slot and may be held in place at any position in the slot by means of the thumb screw 47. The lugs 48 and 49 of each of the gages are adapted to pass through suitable slots in the backing plates 5$^A$ and 5$^B$ and make contact with the material so as to hold it properly in place on the table 6.

I claim:

1. The combination in a miter box of a frame, an arm pivotally mounted on said frame, standards carried on the end of said arm, a guide mounted to slide on said standards, said guide comprising two pair of horizontal guide bars, brackets connecting said pair of guide bars, means on said brackets for holding said guide in a straight line movement along said standards, a channel guide fastened to one of each said two pair of horizontal guide bars, and a saw adapted to reciprocate between said guide bars and in said channel guide.

2. The combination in a miter box of an arm, a platform carried on the end of said arm, uprights mounted on said platform, a guide mounted to slide on said uprights, said guide comprising a series of horizontal guide bars, brackets connecting said horizontal bars, a channel mounted on top of said horizontal bars, and a saw having a reinforced back mounted to reciprocate between said series of horizontal bars.

3. The combination in a miter box of a frame, an arm pivotally mounted on said frame and overhanging said frame on one side thereof, a quadrant carried on said frame and forming a continuation thereof, a saw guide carried on the overhanging portion of said arm over the side of said frame diagonally opposite to said quadrant, said saw guide being adapted to support a saw in a free overhanging position over said frame, a spring pressed locking device being adapted to engage said quadrant and lock said arm to said quadrant.

4. The combination in a miter box of a frame, an arm pivotally mounted on said frame, a series of four uprights mounted on said arm, a bridge member on top of said uprights to hold said uprights together at the top, a guide mounted to slide on said uprights, said guide comprising a series of four horizontal bars, brackets to bind said horizontal bars together into vertically arranged pairs, and lugs carried on said brackets, said lugs being adapted to embrace said uprights and guide said guide on said uprights.

5. The combination in a miter box of a frame, an arm pivotally mounted on said frame, a series of four uprights mounted on said arm, a bridge member on top of said uprights to hold said uprights together at the top, a guide mounted to slide on said uprights, said guide comprising a series of four horizontal bars, brackets to bind said horizontal bars together into vertically arranged pairs, lugs carried on said brackets, said lugs being adapted to embrace said uprights and guide said guide on said uprights, and a hook shaped spring member carried on one side of said guide, the end of said spring member being adapted to engage said bridge on said uprights to normally suspend said guide at a predetermined position on said uprights.

In testimony whereof I affix my signature.

ALPHONSE ILTIS.